United States Patent Office 3,437,633
Patented Apr. 8, 1969

3,437,633
FORMATE STABILIZED POLYOLEFINS
Keisuke Murayama, Shyoji Morimura, Takao Yoshioka, Hideo Horiuchi, Saburo Akagi, Tomoyuki Kurumada, Ichiro Watanabe, and Shoji Kashiide, Tokyo, Japan, assignors to Sankyo Company Limited, Tokyo, and Asahi Kasei Kogyo Kabushiki Kaisha, Osaka, Japan
No Drawing. Filed Sept. 29, 1966, Ser. No. 583,056
Claims priority, application Japan, Sept. 29, 1965, 40/59,629
Int. Cl. C08f 45/58, 3/08; C08c 13/08
U.S. Cl. 260—45.85                5 Claims

ABSTRACT OF THE DISCLOSURE

Vulcanized natural or synthetic rubber and polyolefin are stabilized against degradation by light, heat and oxygen by incorporating in the material phenol formate derivatives containing at least one teritary butyl group and optionally from 1 to 4 alkyl groups other than tertiary butyl group in the phenyl moiety.

---

This invention relates to new use of novel organic compounds. More particularly, it relates to new use of certain novel phenol formates as an antidegradant. Still more particularly, it is directed to new use of the new substituted phenol formates having the following Formula I as an antidegradant for stabilizing various materials against degradation by light, heat and oxygen:

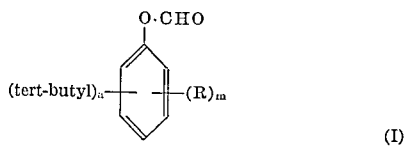

(I)

wherein R is an alkyl group with exception of tert.-butyl group, $m$ is an integer of 0 to 4 inclusive and $n$ is an integer of 1 to 3 inclusive, provided that the total of $m$ and $n$ is not more than 5.

It is therefore an object of this invention to provide new use of new substituted phenol formates of the aforesaid Formula I as an antidegradant for various materials.

Another object of this invention is the provision of various materials stabilized by the novel substituted phenol formates of the aforesaid Formula I.

Other objects will be apparent from the detailed description as follows.

The formates of the aforesaid Formula I are novel compounds unknown in the prior art and they can be easily and advantageously prepared by either reacting the corresponding substituted phenol with a formamide derivative in the presence of phosphorus oxychloride or reacting the corresponding substituted phenol with formic acid in the presence of an esterification catalyst.

Representative phenol formates in this invention include, for example, the following;

4-methyl-6-tert.-butyl phenol formate,
3-methyl-6-tert.-butyl phenol formate,
3-methyl-4,6-di-tert.-butyl phenol formate,
3,4-dimethyl-6-tert.-butyl phenol formate,
2-methyl-4-tert.-butyl phenol formate,
4-ethyl-6-tert.-butyl phenol formate,
3-ethyl-6-tert.-butyl phenol formate,
4-tert.-octyl-6-tert.-butyl phenol formate,
2-tert.-octyl-4-tert.-butyl phenol formate, and
2,4-di-tert.-butyl phenol formate.

The substituted phenol formates in this invention may be satisfactorily applied to any of those materials that would be undesirably deteriorated on exposure to the action of light, oxygen and/or heat.

Typical materials that may be stabilized by the present antidegradant compound include, for example, fats and oils; mineral oils; fatty acids; natural rubber; synthetic rubbers such as polybutadiene, styrenebutadiene copolymer, butadiene-isobutylene copolymer, butadiene-acrylonitrile copolymer, polyisoprene, isobutylene-isoprene copolymer and the like; and other polymeric materials, such as polyolefin, polystyrene, polyamide, polyester, polyacetal, polyethyleneglycol, polypropyleneglycol and the like.

Where the antidegradant compounds in this invention are employed for stabilizing such materials as listed hereinabove, they may be employed by the same fashion as that in case of commercially available antioxidants and ultraviolet absorbants, and other stabilizers commonly used in the art; for instance, by incorporating them into such a material in any desired step during the manufacture or by admixing them with various starting ingredients of such a material prior to processing.

The actual amount of the present antidegradant compound to be used will largely depend upon properties of the material to be stabilized, use of such a material to be intended and other factors, but in general it is preferable for fats and oils, mineral oils and fatty acids to employ the present antidegradant in an amount of about 0.01–0.5% by weight; for both natural and synthetic rubbers in an amount of about 0.01–2% by weight; and for other polymeric materials in an amount of about 0.1–2% by weight, based upon the total weight of a composition.

If desired, other additives commonly used in the art including various commercially available antioxidants and ultraviolet absorbants may be optionally employed together with the present antidegradant.

If necessary, a mixture comprising at least two antidegradant compounds of this invention may be satisfactorily employed for better results.

The following examples are given for the purpose of illustrating excellent oxidation resistance, heat resistance and light resistance of the present antidegradant.

EXAMPLE 1

This example describes test for antioxidant activities of the present antidegradant compounds.

The present compounds given hereinbelow in the indicated amount are thoroughly and uniformly mixed with 1 ml. of the freshly purified oleic acid, respectively. The mixture is then diluted with oleic acid (×100) to form a solution of a concentration of $10^{-4}$ mol./l. The solution thus obtained is measured for pressure difference caused by oxygen-absorbance by employing a Warburg's manometer with a vessel containing 2 ml. of the solution at a temperature of 50° C.±0.01° C.

The pressure difference so determined is expressed in terms of moles of absorbed oxygen, hereinafter referred to as "absorbed oxygen amount."

The same tests as disclosed above are made for antioxidant activities of three controls containing known commercially available antioxidant indicated hereinbelow, respectively.

The results are summarized in the following Table I.

TABLE I

| Compound | Amount used | | Absorbed oxygen amount (micromole) | | |
|---|---|---|---|---|---|
| | Mg. | Mole | After 2 hours | After 3 hours | After 4 hours |
| The present invention: | | | | | |
| 4-methyl-6-tert.-butyl phenol formate | 1.9 | $10^{-5}$ | 0.6 | 0.9 | 1.2 |
| 3-methyl-6-tert.-butyl phenol formate | 1.9 | $10^{-5}$ | 1.3 | 2.1 | 3.0 |
| 3-methyl-4,6-di-tert.-butyl phenol formate | 2.5 | $10^{-5}$ | 0.7 | 1.2 | 1.7 |
| The prior art: | | | | | |
| 4-methyl-6-tert.-butyl phenol | 1.7 | $10^{-5}$ | 2.0 | 3.1 | 4.4 |
| 3-methyl-6-tert.-butyl phenol | 1.7 | $10^{-5}$ | 2.0 | 3.3 | 4.8 |
| 3-methyl-4,6-di-tert.-butyl phenol | 2.2 | $10^{-5}$ | 2.4 | 4.0 | 5.9 |

The same tests as described above are repeated except that the purified tetralin is employed in place of the oleic acid.

The results are summarized in the following Table II.

TABLE II

| Compound | Amount used | | Absorbed oxygen amount (micromole) | | |
|---|---|---|---|---|---|
| | Mg. | Mole | After 1 hours | After 2 hours | After 3 hours |
| The present invention: | | | | | |
| 4-methyl-6-tert.-butyl phenol formate | 1.9 | $10^{-5}$ | 0.29 | 0.58 | 0.88 |
| 3-methyl-6-tert.-butyl phenol formate | 1.9 | $10^{-5}$ | 0.68 | 1.43 | 2.28 |
| 3-methyl-4,6-di-tert.-butyl phenol formate | 2.5 | $10^{-5}$ | 0.41 | 0.85 | 1.43 |
| The prior art: | | | | | |
| 4-methyl-6-tert.-butyl phenol | 1.7 | $10^{-5}$ | 0.60 | 1.23 | 2.04 |
| 3-methyl-6-tert.-butyl phenol | 1.7 | $10^{-5}$ | 1.12 | 2.25 | 3.20 |
| 3-methyl-4,6-di-tert.-butylphenol | 2.2 | $10^{-5}$ | 0.82 | 1.70 | 2.56 |

From the foregoing results it will be apparent that the present antidegradant compounds possess remarkable antioxidant activity, as compared with that of the known antioxidant.

EXAMPLE 2

This example describes test for heat stability of the present antidegradant compounds.

The blend is prepared from the following ingredients:

Ingredient: Parts by weight
Natural rubber (crepe No. 1) _____ 100
Zinc oxide _____ 5
Stearic acid _____ 1
Sulfur _____ 2.5
Vulcanizing accelerator
  (DM: dibenzothiazolyldisulfide) _____ 1

The blend is uniformly mixed with 1 part by weight of the present antidegradant compound indicated hereinbelow by way of a conventional mixing roll and then vulcanized by heating at a temperature of 150° C. and under a pressure of 150 kg./cm.² for 50 minutes.

The vulcanizates thus obtained are tested for heat stability as follows:

The procedure prescribed in JIS-K 6301 is conducted at a temperature of 100° C. for 48 hours and the retaining ratio of tensile strength of the vulcanizate is determined.

Similarly, two controls, i.e. the one in which 1 part by weight of commercially available stabilizer, 2,6-di-tert.-butyl-4-methylphenol(BHT) is contained in place of the present antidegradant compound and the other containing no stabilizer, are prepared and tested as discussed hereinabove.

The results are summarized in the following Table III.

TABLE III

| Compound | Tensile strength (kg./cm.²) | | Retaining ratio |
|---|---|---|---|
| | Before aging | After aging | |
| 4-methyl-6-tert.-butyl phenol formate | 227 | 211 | 93 |
| 4-tert.-octyl-6-tert.- butyl phenol formate | 228 | 164 | 72 |
| 3-methyl-6-tert.-butyl phenol formate | 227 | 172 | 71 |
| 3-methyl-4,6-di-tert.-butyl phenol formate | 226 | 184 | 81 |
| BHT: 2,6-di-tert.-butyl-4-methyl-phenol | 231 | 127 | 55 |
| None | 244 | 102 | 39 |

From the foregoing results it will be apparent that the present antidegradant compounds afford superior heat stability on natural rubber, as compared with that by commercially available BHT.

EXAMPLE 3

This example describes test for light stability of the present antidegradant compounds.

With 100 parts by weight of polypropylene is uniformly admixed 0.25 part by weight of the present antidegradant compound indicated hereinbelow.

The mixture thus obtained is melted by heating and then compression-molded into a sheet of a thickness of 0.5 mm.

The sheet is tested for light stability as follows: By employing the light stability tester prescribed in JIS–L 1044·3·8, the sheet is exposed to ultraviolet radiation at 45° C. and the time until the sheet will become brittle, hereinafter referred to as "brittle time," is measured.

Similarly, as a control, the two sheets, i.e. the one in which 0.25 part by weight of commercially available stabilizer, 2,2' - dimethyl - 4,4' - dihydroxy - 5,5' - di-tert.-butyl diphenyl sulfide is contained in place of the present antidegradant and the other containing no stabilizer, are prepared and tested as discussed hereinabove.

The results are summarized in the following Table IV.

TABLE IV

| Compound: | Brittle time (hrs.) |
|---|---|
| 2,4-di-tert.-butyl phenol formate | 240–260 |
| 4-methyl-6-tert.-butyl phenol formate | 120 |
| 3-methyl-6-tert.-butyl phenol formate | 90 |
| 2,2'-dimethyl-4,4'-dihydroxy-5,5'-di-tert.-butyl diphenyl sulfide | 70 |
| None | 50 |

From the foregoing results it will be apparent that the present antidegradant compounds afford superior light stability on various polymers, as compared with that by known light stabilizer.

What is claimed is:

1. Vulcanized natural rubber stabilized against degradation by light, heat and oxygen wherein there is incorporated a sufficient amount to inhibit degradation of a compound having the formula

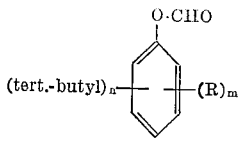

wherein R is an alkyl group with exception of tert.-butyl group, $m$ is an integer of 0 to 4 inclusive and $n$ is an integer of 1 to 3 inclusive, provided that the total of $m$ and $n$ is not more than 5.

2. Vulcanized natural rubber stabilized against degradation by light, heat and oxygen wherein there is incorporated an amount of 0.01–2% by weight of a compound selected from the group consisting of:

4-methyl-6-tert.-butyl phenol formate,
3-methyl-6-tert.-butyl phenol formate,
2,4-di-tert.-butyl phenol formate,
3-methyl-4,6-di-tert.-butyl phenol formate, and
4-tert.-octyl-6-tert.-butyl phenol formate.

3. Vulcanized synthetic rubber stabilized against degradation by light, heat and oxygen wherein there is incorporated a sufficient amount to inhibit degradation of a compound having the formula

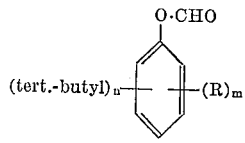

wherein R is an alkyl group with exception of tert.-butyl group, $m$ is an integer of 0 to 4 inclusive and $n$ is an integer of 1 to 3 inclusive, provided that the total of $m$ and $n$ is not more than 5.

4. Polyolefin stabilized against degradation by light, heat and oxygen wherein there is incorporated a sufficient amount to inhibit degradation of a compound having the formula

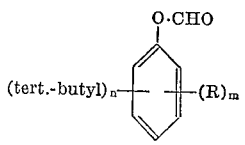

wherein R is an alkyl group with exception of tert.-butyl group, $m$ is an integer of 0 to 4 inclusive and $n$ is an integer of 1 to 3 inclusive, provided that the total of $m$ and $n$ is not more than 5.

5. Polypropylene stabilized against degradation by light, heat and oxygen wherein there is incorporated an amount of 0.1–2% by weight of a compound selected from the group consisting of 4-methyl-6-tert.-butyl phenol formate,
3-methyl-6-tert.-butyl phenol formate,
3-methyl-4,6-di-tert.-butyl phenol formate, and
2,4-di-tert.-butyl phenol formate.

No references cited.

DONALD E. CZAJA, *Primary Examiner.*

HOSEA E. TAYLOR, JR., *Assistant Examiner.*

U.S. Cl. X.R.

99—163; 106—263; 260—398.5, 479, 666.5, 810